3,390,074
HYDROCRACKING PROCESS EMPLOYING
A PROMOTED CATALYST
Bernard F. Mulaskey, Pinole, Calif., assignor to Chevron Research Company, San Francisco, Calif., a corporation of Delaware
No Drawing. Filed Dec. 9, 1966, Ser. No. 600,390
10 Claims. (Cl. 208—111)

ABSTRACT OF THE DISCLOSURE

Hydrocracking a hydrocarbon feed in the presence of hydrogen at hydrocracking conditions with a catalyst containing an iron transitional group metal component associated with a coprecipitated composite of a porous inorganic oxide and antimony or compounds thereof.

---

The present invention relates to hydrocracking processes, and more particularly to a new hydrocracking process employing a catalyst comprising an iron transitional group hydrogenating metal component and a catalytic promoter selected from the group consisting of antimony and compounds of antimony.

Catalytic hydrocracking of hydrocarbons is a well-known process in the petroleum industry for converting mixtures of hydrocarbons to lower boiling products in the presence of hydrogen and a catalyst at elevated temperatures and pressures. Hydrocracking operations are generally characterized by employing catalysts comprising porous inorganic oxide supports having associated therewith hydrogenating metal components. Particularly important metals which are widely used as hydrogenating metal components for hydrocracking catalysts are the iron transitional group metals, that is, iron, cobalt, and nickel. In particular, the use of nickel, or compounds of nickel, deposited on porous inorganic oxide supports, for example, silica containing supports, as catalysts has been a major development in catalytic hydrocracking.

Methods of improving catalysts comprising iron transitional group metals or compounds are continually being sought. In particular, it is desirable in many hydrocracking processes employing catalysts comprising iron transitional group hydrogenating metal components associated with inorganic oxide carriers, to increase the hydrogenation activities of the catalysts beyond the activities which are obtainable with the use of hydrogenating metal components alone on the catalysts. Also, as a result of the high cost of the iron transitional group metals, and in particular nickel, it is desirable to employ in hydrocracking catalysts low concentrations of the hydrogenating metal components and yet maintain the high hydrogenation activity which results from higher concentrations of the hydrogenating metal components.

Furthermore, in many hydrocracking processes, it is advantageous to add halides, particularly fluoride, and/or crystalline zeolitic aluminosilicates, commonly referred to as zeolites, to the hydrocracking catalysts to improve the hydrocracking activity. In the case of the crystalline zeolitic aluminosilicates, it is particularly desirable to employ the zeolites as components in hydrocracking catalysts when hydrocracking nitrogen-containing feeds. The crystalline zeolitic aluminosilicates have been found to possess a tolerance towards nitrogen in the feed and hence do not deactivate as rapidly as the more conventional amorphous-type catalysts. Furthermore, the presence of zeolites in catalysts permit the use of lower temperatures in hydrocracking nitrogen-containing feeds than is practical when employing amorphous-type catalysts without zeolites. However, halides, particularly fluoride, and crystalline zeolitic aluminosilicates have been found to create troublesome difficulties when used as components of hydrocracking catalysts along with hydrogenating metal components selected from the iron transitional group metals, particularly nickel. The halides and/or zeolites appear to have the detrimental effect of causing rapid growth of crystallites of the hydrogenating metal components, which crystallite growth leads to early deactivation and poor regenerability of the catalyst. Methods of reducing the tendency for crystallite growth of the hydrogenating metal components when fluoride and/or zeolites are present in the hydrocracking catalyst are needed.

In accordance with the present invention an improved hydrocracking process to produce lower boiling products from a hydrocarbon feedstock is provided, comprising contacting said hydrocarbon feedstock under hydrocracking conditions in the presence of hydrogen with a catalyst comprising at least one hydrogenating metal component selected from the iron transitional group metals and compounds thereof intimately associated with a coprecipitated composite of a porous inorganic oxide and at least one catalytic promoter selected from the group consisting of antimony and compounds of antimony. Preferably, in accordance with the present invention, said hydrogenating metal component is present in said catalyst in an amount from about 3 to 15 weight percent metal and the weight ratio of said catalytic promoter to said hydrogenating metal component, expressed as metal, is from about 0.1 to 4. Furthermore, it is preferable that said hydrogenating metal component is nickel or a compound thereof.

As a specific embodiment of the present invention, it has been discovered that a process for hydrocracking a hydrocarbon feedstock to produce lower boiling products can be advantageously conducted by contacting said feedstock in the presence of hydrogen at hydrocracking conditions with a catalyst composition comprising a coprecipitated composite of a porous inorganic oxide, at least one catalytic promoter from the group consisting of antimony and compounds of antimony, and at least one hydrogenating metal component selected from the iron transitional group metals and compounds thereof.

As a further specific embodiment of the present invention, a hydrocracking process is accomplished by contacting a hydrocarbon feed in the presence of hydrogen at hydrocracking conditions with a catalyst comprising a hydrogenating metal component selected from the iron transitional group metals and compounds thereof intimately associated with a coprecipitated composite of a porous inorganic oxide and at least one catalytic promoter selected from the group consisting of antimony and compounds of antimony, said catalyst having a crystalline zeolitic aluminosilicate intimately associated therewith.

The present invention is based on the discovery that the hydrogenation activity of a hydrocracking catalyst comprising a coprecipitated composite of a porous inorganic oxide and a catalytic promoter selected from the group consisting of antimony and compounds of antimony is significantly higher than that of a catalyst without said antimony present and of a catalyst with said antimony present but not present as part of the coprecipitated composite. The hydrogenating metal component selected from the iron transitional group metals and compounds thereof can be provided as part of the catalyst of the present invention by incorporation onto the coprecipitated composite, as by impregnation, but preferably said hydrogenating metal component is present as a component of the coprecipitated composite. That is, the composite as coprecipitated preferably comprises a porous inorganic oxide, a catalytic promoter selected from the group consisting of antimony and compounds of antimony, and a hydrogenating metal component selected from the iron transitional group metals and compounds thereof.

Impregnation of antimony or compounds of antimony onto a previously formed porous inorganic oxide carrier does not produce a catalyst having increased hydrogenation activity for hydrocracking, but to the contrary, results in a catalyst having less hydrogenation activity than a catalyst without antimony thereon. Surprisingly, the hydrogenation activity of a hydrocracking catalyst containing antimony is significantly higher when said antimony is present as part of a coprecipitated composite than when said antimony is present through an impregnation technique.

Furthermore, it is surprisingly found that the hydrogenating metal components used with the catalyst of the present invention must be from the iron transitional group metals and compounds thereof, and preferably nickel and compounds thereof, in order for the antimony-promoted catalyst to exhibit an increase in hydrogenation activity. When a noble metal is used as the hydrogenating metal component with a coprecipitated composite of a porous inorganic oxide and antimony, the catalyst has decreased hydrocracking activity and decreased hydrogenation activity when compared with a noble metal-containing catalyst without antimony.

The catalyst composition of the present invention has other beneficial properties apart from increased hydrogenating activity when used in the hydrocracking of hydrocarbons. For example, it has been found that halides, and in particular fluoride, and/or crystalline zeolitic aluminosilicates can be admixed with the catalyst of the present invention and used in a hydrocracking process without resulting in the previously mentioned troublesome increase in the rate of growth of crystallites of the hydrogenating metal component present therein and the corresponding deactivating effect said crystallite growth has on the hydrocracking activity of said catalyst. Thus, the presence of antimony, or compounds thereof, retards nickel crystalllite growth during hydrocracking with a catalyst comprising a hydrogenating nickel component intimately associated with a coprecipitated composite of silica-alumina and antimony when the catalyst has a crystalline zeolitic aluminosilicate intimately admixed therewith. Other advantages resulting from the hydrocracking process of the present invention include lower catalyst fouling rates; longer periods between regeneration of the catalyst; lower pressures at which the hydrocracking process can be conducted; and the ability to use less hydrogenating metal component, for example, nickel, in order to maintain the same high hydrogenation activity which results from the presence of high concentrations of the hydrogenating metal component.

Suitable porous inorganic oxides, of which the coprecipitated composite is in part composed, include the oxides of the metals and/or nonmetals of Groups II through VI of the Periodic Table and combinations thereof. It is, of course, necessary that the metals and/or nonmetals which find use for purposes of the present invention can be coprecipitated along with the catalytic promoter, that is, antimony or compounds thereof. Thus, for example, suitable metals and/or nonmetals whose oxides form the porous inorganic oxide for use in the present invention and which can be coprecipitated with the catalytic promoter include silicon, aluminum, magnesium, titanium, zirconium, and combinations thereof. Generally, it is preferable to employ at least one metal and/or nonmetal whose oxide is acidic in nature. For hydrocracking purposes it is generally preferable that an oxide of silicon be present as part of the coprecipitated composite. Thus, suitable porous inorganic oxides which can be part of the coprecipitated composite include the siliceous oxides, for example, silica-alumina, silica-magnesia, silica-zirconia, silica-magnesia-titania and silica-alumina-zirconia. Particularly preferred inorganic oxides are the silica-aluminas, particularly silica-aluminas having silica contents in the range of 30 to 99 weight percent.

By "porous" (inorganic oxide) is meant the inorganic oxides which have a high surface area, that is, greater than 50 m.$^2$/gm. and preferably greater than 150 m.$^2$/gm. Generally, the porous inorganic oxides which are useful as catalyst supports for the present invention have surface areas from about 50 to 700 m.$^2$/gm.

The hydrogenating metal component for use in the present invention is selected from the iron transitional group metals and compounds thereof. Preferably, the catalyst for use in the present invention comprises a hydrogenating metal component selected from the group consisting of cobalt, compounds of cobalt, nickel, and compounds of nickel. More preferably, the catalyst comprises a hydrogenating metal component selected from the group consisting of nickel and compounds of nickel. The hydrogenating metal component can be in the metallic form or in the compound from such as, for example, the oxide or sulfide form. The sulfide form of the metal is the preferred compound form for purposes of the present invention. However, any compound of the metal which performs as a hydrogenating metal component can be used in the catalyst.

The hydrogenating metal component is preferably present in the finished catalyst in an amount from about 3 to 15 weight percent based on the metal. That is, regardless of the form in which the hydrogenating metal component exists in the finished catalyst, whether as metallic metal or as a compound, such as the oxide or sulfide, the amount of hydrogenating metal component, calculated as the metal, should be from about 3 to 15 weight percent and preferably 5 to 10 weight percent of the finished catalyst. A catalyst containing less than about 3 weight percent hydrogenating metal content is generally too low in hydrogenating activity to be useful in hydrocracking of hydrocarbons; rather, hydrocracking with such a catalyst results in the production of excessive coke which results in rapid deactivation of the catalyst. Catalyst compositions comprising total hydrogenating metal contents in excess of 15 weight percent can be prepared and employed in hydrocracking processes. Generally, however, it is not advantageous to exceed 15 weight percent hydrogenating metal content in a catalyst because of the high cost of the hydrogenating metal component.

The catalytic promoter which is coprecipitated with the metals and/or nonmetals whose oxides form the porous inorganic oxide is selected from the group consisting of antimony and compounds of antimony. The catalytic promoter is preferably present in the final catalyst composition in an amount, based on the weight ratio of the catalytic promoter to the hydrogenating metal component, expressed as metal, of from about 0.1 to 4 and more preferably from about 0.2 to 2. That is, regardless of the form in which the antimony exists in the coprecipitated composite, the amount of antimony which is preferred in the final catalyst composition is calculated on the basis of the weight ratio of the metallic form of antimony to the metallic form of the hydrogenating metal components, said ratio preferably being from about 0.1 to 4. The antimony may exist in the final catalytic composition in the metallic form or may exist in any suitable compound form, e.g., as an oxide or sulfide, or as a compound formed by combination with the iron transitional group metal or with the inorganic oxide support.

The coprecipitated composite of the porous inorganic oxide and antimony can be prepared by any of the conventional methods for coprecipitating or cogelling two or more metals or compounds thereof and/or nonmetals or componuds thereof. A preferred method of preparation of the catalytic composition for use in hydrocracking is the simultaneous coprecipitation or cogelling of a mixture of a compound of antimony and compounds of the metals and/or nonmetals whose oxides form the porous inorganic oxide carrier. In general, preparation of the coprecipitated composite can be accomplished by forming a solution and/or a sol of the compounds, subsequently precipitating the mixture, preferably at a pH from 5.5 to 8 by the addition of a precipitating agent, as for example, a base, and then washing the coprecipitated composite to remove extraneous materials. Finally, the coprecipitated composite can be dried and then calcined at an elevated temperature. Thus, for example, a coprecipitated composite comprising antimony intimately associated with silica-alumina can be prepared by forming an aqueous solution of aluminum chloride, and antimony oxychloride and thereafter adding a silica sol prepared from sodium silicate. The mixture can then be coprecipitated by the addition of ammonium hydroxide; thereafter the coprecipitated composite can be washed, dried and calcined.

In order to prepare a coprecipitated composite comprising the porous inorganic oxide and the catalytic promoter, it is desirable that the starting components be such that when admixed together, the resulting mixture will form a solution and/or sol so as to obtain uniform dispersion throughout the mixture.

The compounds in the initial mixture can advantageously be salts such as the nitrates, citrates, formates, alkoxides, sulfates, and oxychlorides. Preferably, chlorides and acetates are employed. It is often desirable to employ chloride salts due to their readiness to form solutions with other compounds, their commercial availability and relatively low price. The anion content, e.g., chloride, in the final coprecipitate is preferably reduced to below about 0.25 percent of the total weight of the final coprecipitate. Washing with water can often effectively lower the anion content to the desirable limit. If anions are present in the coprecipitate which are difficult to remove by washing, such anions can be ion-exchanged with anions more easily removable by washing. Preferred anions for use in the ion-exchange are the bicarbonates, carbonates, acetates and formates.

As mentioned previously, it is generally advantageous to have silica present as part of the porous inorganic oxide. Thus, in preparing the coprecipitated composite by coprecipitating a mixture, e.g., solution and/or sol, of a compound of antimony and compounds of the metals and/or nonmetals whose oxides form the porous inorganic oxide, a form of silicon is desirably present in the mixture prior to coprecipitation. It is often desirable to employ silica sols in which case the silica sol can be made by any conventional procedure. Thus, silica sols can be made by hydrolyzing tetraethyl orthosilicate with an aqueous HCl solution. Likewise, silica sols can be prepared by contacting silicon tetrachloride with a cold methanol and water solution, or with 95 percent ethyl alcohol, or with cold water or ice. Also, silica sols can be made by contacting sodium silicate with an ion-exchange resin to remove the sodium or by contact with an acid at a pH of about 2.5 or less.

After formation of the initial mixture of a compound of antimony and compounds of the metals and/or nonmetals whose oxides form the porous inorganic oxide, the mixture is coprecipitated by conventional techniques. Precipitation is preferably conducted at a pH between about 5.5 and about 8. Thus, the initial mixture, if acidic, can be precipitated by the addition of a base or alkoxide. If the mixture is basic, it can be precipitated with an acid. The precipitation can be step-wise as by a form of titration, or simultaneous, as by mixing of acidic or basic solutions as the case may be in the proper ratios. It is preferable that the precipitating agent should not introduce any components in the mixture that are deleterious.

Following coprecipitation of the mixture of compounds, the excess liquid is usually removed by filtration. Thereafter the precipitate is washed and ion-exchanged to remove impurities. Washing is generally conducted in more than one step, using water or dilute aqueous solutions of ammonium salts, e.g., ammonium acetate. The coprecipitated composite is then usually dried in air or inert gases at a temperature less than 400° F., preferably from about 150°–300° F. The coprecipitate can then be calcined, generally at a temperature of from about 750°–1400° F. in the presence of any oxygen-containing gas, such as air.

The hydrogenating metal component may be intimately associated with the coprecipitated composite by conventional techniques, such as, for example, impregnation. Impregnation is generally accomplished by using an aqueous solution of a suitable hydrogenating metal compound as, for example, the chloride, sulfate, nitrate, or acetate. If it is desirable to incorporate two or more hydrogenating metal components with the coprecipitated composite, either simultaneous or sequential impregnation of the hydrogenating metal components is suitable.

As a preferred feature of the present invention, the hydrogenating metal component is associated with the catalyst by coprecipitation of a mixture, e.g., solution and/or sol, of a compound of the hydrogenating metal component, a compound of antimony and compounds of metals and/or nonmetals whose oxides form the porous inorganic oxide. The coprecipitation procedure described above can be followed when it is desired to prepare the catalyst having the hydrogenating metal component associated therewith by coprecipitation.

It has been found particularly advantageous to employ for hydrocracking a catalyst comprising a hydrogenating metal component selected from the iron transitional group metals and compounds thereof intimately associated with a coprecipitated composite of a porous inorganic oxide, preferably a siliceous oxide, for example, silica-alumina, and a catalytic promoter selected from the group consisting of antimony and compounds of antimony, said catalyst having intimately associated therewith a crystalline zeolitic aluminosilicate. The crystalline zeolitic aluminosilicate can be admixed with the catalyst simply by physically mixing the zeolite and the coprecipitated composite either in the dry state, or in the presence of water. It is generally preferred, however, to incorporate the crystalline zeolitic aluminosilicate into the mixture, e.g., solution and/or sol, of a compound of antimony and compounds of metals and/or nonmetals whose oxides form the porous inorganic oxide prior to or during coprecipitation of said mixture. The zeolite is thus insured of being intimately admixed and dispersed throughout the coprecipitated composite. The crystalline zeolitic aluminosilicate can be added to the mixture at any suitable stage of the catalyst preparation. It is important that the mixture not be of sufficient acidity to destroy the crystallinity of the zeolite. Regardless of the method of association of the crystalline zeolitic aluminosilicate with the coprecipitated composite, the zeolite preferably should be present in the final catalytic composition in an amount from 5 to 80 weight percent, more preferably in an amount from 5 to 50 weight percent, and most preferably in an amount from 10 to 35 weight percent in order to obtain the highest activity advantage from the zeolite.

The hydrogenating metal component can be intimately associated with the coprecipitated composite prior to admixing with the zeolite; however, if desired, the hydrogenating metal component can be added to the catalyst as by impregnation after admixing with the zeolite. The crystalline zeolitic alluminosilicate can also contain a hydrogenating metal component intimately associated therewith.

The crystalline zeolitic aluminosilicates contemplated for use in the present invention can be either natural or synthetically prepared materials. Crystalline zeolitic aluminosilicates comprise aluminosilicate cage structures in which alumina and silica tetrahedra are intimately connected with each other in an open three-dimensional network. The tetrahedra are cross-linked by the sharing of oxygen atoms. In general, the spaces between the tetrahedra are occupied by water molecules prior to dehydration. Dehydration results in crystals interlaced with channels or pores of molecular dimensions, which channels or pores selectively limit the size and shape of foreign substances that can be adsorbed. Thus, the crystalline zeolitic aluminosilicates are often referred to as molecular sieves. In general, the crystalline zeolitic aluminosilicates have exchangeable zeolitic cations associated with the silica-alumina tetrahedra which balance the negative electrovalence of the tetrahedra. The cations may be any number of ions such as, for example, the alkali metal ions, the alkaline earth ions, and the rare earth ions. The cations may be mono-, di-, and trivalent. In general the preferred forms are those wherein the exchangeable zeolitic cations are divalent metals and/or hydrogen. Normally the zeolites are prepared first in the sodium or potassium form, after which the monovalent cations are ion-exchanged out with desired divalent metal cations, such as calcium, magnesium or manganese cations, or where the hydrogen form is desired, with ammonium cations followed by heating to decompose the ammonium cations to leave hydrogen ions. The hydrogen form is often referred to as decationized.

The crystalline zeolitic aluminosilicates possess relatively well-defined pore structures. For purposes of the present invention, it is preferred that the pore structures of the crystalline zeolitic aluminosilicates comprise openings characterized by pore diameters greater than 6 A. and particularly uniform pore diameters of approximately 6–15 A. The uniform pore structures wherein the pores are greater than 6 A. permit hydrocarbons access to the catalyst. Generally, zeolites which find use for purposes of the present invention have silica-alumina ratios in the crystalline form greater than about 2. Examples of appropriate crystalline zeolitic aluminosilicates are the faujasites, synthesized zeolite X disclosed in U.S. Patent 2,882,244, zeolite Y disclosed in U.S. Patent 3,130,007, zeolite L disclosed in U.S. Patent 3,216,789, and decationized zeolite Y described in U.S. Patent 3,130,006.

The catalyst of the present invention can be further promoted for hydrocracking activity by the addition of halides. Preferably fluoride is employed. The total fluoride content is preferably associated with the catalyst in an amount from 0.1 to 5 weight percent. The fluoride can be incorporated onto the catalyst at any suitable stage of catalyst manufacture, as for example, prior to or following coprecipitation of a mixture of a compound of antimony and compounds of the metals and/or nonmetals whose oxide form the porous inorganic oxide carrier. In general, the fluoride is combined with the catalyst by contacting suitable compounds such as ammonium fluoride or hydrogen fluoride, either in a water-soluble or in gaseous form, with the coprecipitated composite. Preferably the fluoride is incorporated onto the coprecipitated composite from an aqueous solution containing the fluoride.

It is generally preferred that the hydrogenating metal component exist in the sulfided form at least during part of the hydrocarbon hydrocracking process. The antimony may also exist in the sulfided form. In particular it is preferred that the catalyst contain at least 0.2 weight percent sulfur. Sulfiding can be accomplished prior to contacting the hydrocarbon feed with the catalyst under hydrocracking conditions, as by contacting the catalyst with a sulfur-affording gas, for example, hydrogen sulfide or dimethyldisulfide, under conditions to result in sulfiding of the hydrogenating metal, that is, the iron, cobalt or nickel. The antimony may be sulfided at this time also. Other sulfur-affording gases include mixtures of hydrogen and $H_2S$ and mixtures of hydrogen with organic sulfur compounds reducible to $H_2S$ at the sulfiding conditions employed. Generally, the catalyst temperature during sulfiding is controlled below 850° F. and preferably below 750° F. Good results can be obtained by contacting the catalyst with a mixture of hydrogen and vaporized organic compounds of dimethyldisulfide, isopropyl mercaptan, or carbon disulfide at temperatures in the range of 450° to 650° F. The catalyst can be contacted with a stream of hydrogen prior to sulfiding and during sulfiding.

If it is desired to sulfide the catalytic composition during contact with the hydrocarbon feed, a minor amount of sulfur or sulfur compound, such as dimethyldisulfide or hydrogen sulfide, can be introduced into the hydrocarbon feed stream during the hydrocracking process. Moreover, a hydrocarbon feed stream containing organic sulfur compounds may advantageously be employed. The exact form of sulfur used in the sulfiding process is not critical. Sulfur introduced into the reaction zone can be introduced in any convenient manner and at any convenient location. It can be contained in the fresh liquid hydrocarbon feed, the hydrogen gas, a recycle liquid stream or a recycle gas stream or any combination.

The form in which the catalyst is used will depend on the type of process involved in the hydrocracking operation, that is, whether the process involves a fixed bed, moving bed, or a fluid operation. Generally, the catalyst will exist in the form of beads, tablets, pellets, spheroidal particles or extruded particles for use in fixed bed or moving bed operations. For a fluidized bed operation, the catalyst will generally exist in a finely-divided or powder form. The catalytic composition can be mixed with a support or binder, if desired, to provide beneficial properties such as increased compactibility or attrition resistance. The particular chemical composition of the support or binder is not critical. It is, however, necessary that the support or binder employed be thermally stable under the conditions at which the hydrocracking process is carried out.

The hydrocarbon feeds which can be employed in the hydrocracking process of the present invention include feeds boiling from below about 300° to 1100° F. or higher. Particular feedstocks which may be used include heavy virgin crudes, vacuum distillation residues, catalytic cycle oils, gas oils resulting from the visbreaking of heavy oils, solvent deasphalted oils and hydrocarbon distillates. These hydrocarbon fractions can be derived from petroleum crude oils, gilsonite, shale oils, tar sand oils, coal hydrogenation and carbonization products and the like. The hydrocarbon feedstocks employed in the process of the present invention can contain nitrogen and/or sulfur compounds. For example, nitrogen in the form of ammonia, as well as organic nitrogen compounds, can be present in the feed. It is, however, also understood that the hydrocarbon feedstocks can be hydrofined prior to being hydrocracked. While it is preferable to maintain the organic nitrogen content of the feed below about 200 p.p.m. and preferably below about 20 p.p.m., feeds containing higher concentrations of organic nitrogen can also be advantageously hydrocracked. When a crystalline zeolitic aluminosilicate is present in the final catalyst composition, feeds containing up to about 2000 p.p.m. organic nitrogen can advantageously be hydrocracked.

In general, hydrocracking is accomplished at a temperature from about 450° to 900° F. and a pressure between about 500 to 10,000 p.s.i.g. The higher temperatures and pressures are used with the higher boiling feedstocks and those feedstocks containing higher concentrations of organic nitrogen. Preferably, pressures between 1200 and 6000 p.s.i.g. are used. The hydrogen flow rate into the reactor is maintained between 1,000 to 20,000 s.c.f./bbl. of feed and preferably in the range 4,000 to 10,000 s.c.f./bbl. The hydrogen consumption will vary depending on the properties of the feed and the other hydrocracking conditions used, but there is generally consumed in the hydrocracking zone at least 500 s.c.f./bbl. of hydrogen per barrel of feed. In general, the hydrogen consumption will range from 500 to 5,000 s.c.f./bbl. The excess hydrogen not consumed in the reaction is separated from the treated feed and preferably purified and recycled. The liquid hourly space velocity (LHSV) will generally be in the range from 0.1 to 10 and preferably, 0.3 to 5.

Reference will be made in the following examples to catalyst activity, which refers to the ability of the catalyst to promote hydrocracking reactions. The activity of any particular catalyst can best be shown by a standard test from which the "activity index" of the catalyst can be determined. The activity index provides a convenient and reliable method for comparing one catalyst against another. A definition and description of activity index is found in U.S. Patent 3,243,368. Basically, the procedure used for testing the catalysts described in the examples herein to determine their activity indices involved passing a straight run hydrocarbon feedstock (identified as Feed 1 in Table I) along with 12,000 s.c.f. hydrogen per barrel of feed in contact with a particular catalyst in a reactor at a liquid hourly space velocity of 2 and at a reactor temperature of 540° F. for approximately 38 hours. After about 38 hours the flow of straight run hydrocarbon feedstock was discontinued and a light cycle oil (identified as Feed 2 in Table I) was introduced and passed in contact with the catalyst for a continuous period of approximately 30 hours. During this latter 30 hours samples of the product were collected at approximately two-hour intervals. These samples were allowed to flash off light hydrocarbons at a controlled temperature and atmospheric pressure, following which a determination was made of the API gravity of each sample. The individual API gravity values were then plotted and a smooth curve drawn from which either an average or median API gravity value was obtained. The difference between the API gravity of the product samples and the API gravity of the feed, that is, the gravity increase due to formation of lower boiling products by hydrocracking, is referred to as the activity index of the catalyst. This method of determining the activity index is a rapid and convenient method for characterizing a catalyst which correlates smoothly with hydrocracking conversion. In measuring the activity index the feedstock employed should be the same or similar for each catalyst tested in order to draw proper conclusions as to the relative hydrocracking activities of the catalysts.

TABLE I

|  | Feed 1 | Feed 2 |
|---|---|---|
| Gravity, °API | 31.5 | 29.3 |
| Aniline Point, °F | 172.6 | 115.7 |
| Nitrogen, p.p.m | 0.44 | 0.24 |
| Aromatics, vol. percent | 10.8 | 33.3 |
| Naphthenes, vol. percent | 72.2 | 56.7 |
| Paraffins, vol. percent | 17.1 | 10.0 |
| Feed Distillation Range, °F.: | | |
| Start | 391 | 367 |
| 5% | 493 | 427 |
| 10% | 534 | 447 |
| 30% | 602 | 497 |
| 50% | 643 | 536 |
| 70% | 676 | 584 |
| 90% | 720 | 657 |
| 95% | 736 | 687 |
| End Point | 809 | 755 |

The following examples will more clearly set forth the various features of the present invention. The first example demonstrates the importance of incorporating the antimony promoter in the coprecipitate when preparing a catalyst for hydrocracking in accordance with the invention.

Example 1

A catalyst was prepared by adding 335 grams of nickel chloride solution containing 181 grams/liter of nickel, 13.5 grams of antimony oxychloride in 150 ml. of water to which has been added 3 ml. concentrated HCl, and 1464 grams of an aluminum chloride solution containing 117 grams/liter of aluminum directly to a vessel containing 4 liters of water and 171 ml. of glacial acetic acid. Thereafter 878 grams of commercial sodium silicate (29.6% $SiO_2$ and 9.2% $Na_2O$) dissolved in 3 liters of water were added while rapidly stirring to form a clear solution and/or sol. The components were then coprecipitated to a final pH of about 7.5 by slowly adding, accompanied by stirring, a solution composed of 750 ml. of 15 M ammonium hydroxide in 2 liters of water. The resulting slurry was then aged for one hour at a temperature of 200° F., the pH of the slurry being about 6.5 to 7.5 during the aging period. The slurry was then collected and filtered to remove excess water and the precipitate recovered. The latter was then sequentially washed four times with a 1% aqueous solution of ammonium acetate followed by one wash with distilled water. All washes were conducted at a temperature of about 150° F. and a pH of about 6.5. The precipitate from the last wash was dried for 15 hours at 150° F. and thereafter calcined by contacting with air at a temperature ranging from 400 to 1000° F. for 6 hours, and then contacted with dried air at a temperature of 1350° F. for 3 hours. The resulting composite of metal oxides, hereinafter referred to as Catalyst A, contained approximately 11 weight percent nickel oxide and 2.5 weight percent antimony oxide, and 86.5 weight percent silica-alumina, the silica to alumina weight ratio being 1.9.

Several other catalysts, referred to hereinafter as Catalysts B, C and D, were prepared and compared as hydrocracking catalysts with Catalyst A.

Catalyst B was prepared by impregnating antimony onto a sample of Catalyst A. The impregnation was accomplished by dunking a sample of Catalyst A into a solution comprising triphenyl stilbene in hexane. The final catalyst composition contained 2.5 weight percent impregnated antimony.

Catalyst C comprised a coprecipitated composite of nickel oxide and silica-alumina, prepared generally by the procedure used for Catalyst A but without antimony. The finished catalyst contained about 11 weight percent nickel oxide.

Catalyst D was prepared by impregnating a sample of Catalyst C with antimony. The impregnation was accomplished by dunking a sample of Catalyst C into a solution comprising triphenyl stilbene in hexane. The final catalyst composition contained 2.5 weight percent impregnated antimony.

Catalysts A, B, C, and D were tested for hydrocracking under conditions to permit the determination of the activity indices of the catalysts. The activity indices of Catalysts A through D are tabulated in Table II. The aniline points determined during hydrocracking are also tabulated in Table II.

TABLE II

| Catalyst | Activity Index | Aniline Point, °F. |
|---|---|---|
| A (Ni+Sb) | 22.7 | 138.0 |
| B (Sb impregnated on Catalyst A) | 11.6 | 135.0 |
| C (Ni) | 12.3 | 134.0 |
| D (Sb impregnated on Catalyst C) | 13.8 | 130.7 |

The aniline point of the product is a relative measure of the aromaticity of the product or in other words, a measure of the hydrogenation activity of the catalyst. An increase in the aniline point represents a decrease in the product aromaticity or an increase in the hydrogenation activity of the catalyst. Under similar reaction conditions the aniline point of the product obtained from a hydrocracking process using a catalyst comprising a coprecipitated composite of a porous inorganic oxide and an antimony promoter is considerably higher than the aniline point of the product obtained in a hydrocracking process employing a catalyst comprising a coprecipitated composite of a porous inorganic oxide without antimony present. For example, compare the results from hydrocracking with Catalyst A and Catalyst C in Table II. Hydrocracking with Catalyst A, a process of the present invention, is seen to produce a product having an aniline point of 138° F. as compared to a product having an aniline point of 134° F. when hydrocracking with a catalyst not having antimony as part of the coprecipitated composite. Also, it can be seen from the activity indices of Catalysts A and C that a hydrocracking catalyst comprising a coprecipitated composite of a porous inorganic oxide and an antimony promoter has an activity index considerably higher than the activity index of a hydrocracking catalyst without antimony.

Impregnating antimony onto a porous inorganic oxide does not produce a catalyst having increased hydrogenating activity in a hydrocracking process when compared to a catalyst without antimony present. In fact, as seen from a comparison of the aniline points of products obtained from hydrocracking with Catalyst D and Catalyst C, the hydrogenation activity of a catalyst decreases when antimony is present by impregnation as compared to a catalyst without antimony present at all.

Furthermore, the incorporation of antimony onto a catalyst comprising a coprecipitated composite of a porous inorganic oxide and an antimony promoter lowers the hydrogenation activity of the catalyst (compare, e.g., Catalyst B with Catalyst A). The hydrocracking activity as measured by the activity index also decreases dramatically when antimony is impregnated onto a catalyst comprising a coprecipitated composite of a porous inorganic oxide and an antimony promoter.

The above results indicate that a catalyst comprising a coprecipitated composite of a porous inorganic oxide and an antimony promoter is markedly superior for hydrocracking, especially insofar as hydrogenation activity is concerned, to a catalyst having no antimony present and to a catalyst comprising a porous inorganic oxide and having antimony present by impregnation.

The following example shows that the promoting activity of antimony is not exhibited by other Group Va metals.

Example 2

Two catalysts were prepared and tested for hydrocracking a light cycle oil having a boiling point range from about 406° F. to 708° F. One of the catalysts tested is identified as Catalyst A in Example 1. The other catalyst, hereinafter referred to as Catalyst E, was prepared generally by the procedure set out for Catalyst A of Example 1, but using bismuth instead of antimony. Catalyst E contained about 4.5 weight percent bismuth, 8.7 weight percent nickel, the remainder being silica-alumina. The bismuth was added to the solution and/or sol as bismuth chloride.

Catalysts A and E were sulfided prior to contact with the hydrocarbon feedstock in the hydrocracking process. Each catalyst was sulfided by insertion into a reactor where it was heated to 520° F. at a pressure of about 1200 p.s.i.g. in flowing hydrogen for a period of about one hour, then substantially sulfided by passing a mixture of dimethyldisulfide and mixed hexanes (the mixture contained 7.3 volume percent dimethyldisulfide) into the flowing hydrogen. Injection of the sulfiding agent was continued for about one hour at a temperature of about 540° F. and then discontinued.

The hydrocracking process was conducted at a pressure of 1200 p.s.i.g., a liquid hourly space velocity (LHSV) of 2 and in the presence of 12,000 s.c.f. hydrogen per barrel of feed. The catalyst temperature required for 60% conversion of the feed to lower boiling point products, as well as the aniline points at 60% conversion, were obtained and are tabulated in Table III.

TABLE III

| Catalyst | 60% Conversion | |
|---|---|---|
| | Temp., ° F. | Aniline Point, ° F. |
| A (Ni+Sb) | 565 | 132.6 |
| E (Ni+Bi) | 644 | 113.5 |

The above data show that incorporation of bismuth into the catalyst by coprecipitation results in a catalyst having very low hydrogenation activity, as determined from the low aniline point of the product produced in a hydrocracking process using the bismuth-containing catalyst (Catalyst E). Also note the high temperature required to maintain 60% conversion using the bismuth-containing catalyst.

The following example shows the beneficial effect of a crystalline zeolitic aluminosilicate admixed with an antimony-promoted catalyst for hydrocracking nitrogen-containing feeds.

Example 3

Two catalysts were tested for hydrocracking of a light cycle oil containing 17 to 20 p.p.m. nitrogen. One catalyst, hereinafter referred to as Catalyst F, was prepared generally by the method set forth for Catalyst A in Example 1, and comprised a coprecipitated composite of silica-alumina, a nickel hydrogenation component, and a catalytic promoter (antimony), the coprecipitated composite having a crystalline zeolitic aluminosilicate of the Y-type intimately admixed therewith. The catalyst contained 9.2 weight percent nickel, 6.4 weight percent antimony and 30 weight percent zeolite. The other catalyst, referred to as Catalyst G, was identical to Catalyst F except no antimony was present. The two catalysts were sulfided by the procedure described in Example 2.

The hydrocracking process was conducted at a pressure of 1600 p.s.i.g., an LHSV of 2, and in the presence of 12,000 s.c.f. hydrogen per barrel of feed. The temperature required for 60% conversion of the feed to lower boiling products was measured for each catalyst. The aniline point at 60% conversion was also determined for each catalyst. The results are tabulated in Table IV.

TABLE IV

| Catalyst | 60% Conversion | |
|---|---|---|
| | Temp., ° F. | Aniline Point, ° F. |
| F (Ni+Sb+zeolite) | 651 | 129.0 |
| G (Ni+zeolite) | 674 | 117.7 |

As shown, a catalyst comprising a crystalline zeolitic aluminosilicate intimately associated with a coprecipitated composite of a porous inorganic oxide and an antimony promoter is far superior for hydrocracking a nitrogen-containing feed than a catalyst comprising a crystalline zeolitic alumino-silicate intimately associated with a coprecipitated composite of a porous inorganic oxide but without antimony being present. From the data in Table IV, it can be seen that hydrocracking according to a process of the present invention, that is, hydrocracking with Catalyst F, can be conducted at a significantly lower temperature to obtain the desired 60% conversion to lower boiling products, while maintaining an extremely high hydrogenation activity, as compared to hydrocracking with Catalyst G.

The final example shows that the antimony does not promote a noble metal-containing catalyst.

Example 4

A hydrocracking process was conducted using a hydrocarbon feedstock similar to the light cycle oil described as Feed 2 in Table I. The hydrocracking conditions comprised a pressure of 1200 p.s.i.g., an LHSV of 2, and a hydrogen to feed ratio of 12,000 s.c.f. hydrogen per barrel of feed. The reactor temperature was maintained at 540° F. throughout the process. The hydrocracking process was performed at conditions to enable a determination of the activity index of each catalyst tested. The aniline point was also measured.

Two catalysts were tested in the hydrocracking process. One catalyst, hereinafter referred to as Catalyst H, comprised a coprecipitated composite of 0.5 weight percent platinum and silica-alumina. The other catalyst, hereinafter referred to as Catalyst I, comprised a coprecipitated composite of 0.5 weight percent platinum, 0.006 weight percent antimony and silica-alumina. The results are tabulated in Table V.

TABLE V

| Catalyst | Activity Index | Aniline Point, ° F. |
|---|---|---|
| H (Pt) | 34.3 | 135 |
| I (Pt+Sb) | 12.9 | 115 |

As shown in Table V, the presence of antimony in a platinum-containing catalyst (Catalyst I) significantly lowers the activity index and the hydrogenation activity of the catalyst, as compared to a platinum-containing catalyst without antimony.

The foregoing disclosure of this invention is not considered to be limiting since variations can be made by those skilled in the art without departing from the scope and spirit of the appended claims.

I claim:

1. A process for hydrocracking a hydrocarbon feed to produce lower boiling products which comprises contacting said feed in the presence of hydrogen at hydrocracking conditions with a catalyst comprising at least one hydrogenating metal component selected from the iron transitional group metals, and compounds thereof, in an amount from about 3 to 15 weight percent metal, intimately associated with a coprecipitated composite of a porous inorganic oxide and at least one catalytic promoter selected from the group consisting of antimony, and compounds of antimony, the weight ratio of said catalytic promoter to said hydrogenating metal component, expressed as metal, being from about 0.1 to 4.

2. The process of claim 1 wherein said hydrogenating metal component is selected from the group consisting of nickel, compounds of nickel, cobalt, and compounds of cobalt.

3. The process of claim 1 wherein said hydrogenating metal component is selected from the group consisting of nickel and compounds of nickel.

4. The process of claim 1 wherein said inorganic oxide is silica-alumina.

5. The process of claim 1 wherein a crystalline zeolitic aluminosilicate is intimately associated with said catalyst.

6. The process of claim 1 wherein said catalyst is sulfided prior to contact with said hydrocarbon feed.

7. The process of claim 1 wherein said catalyst is promoted with from 0.1 to 5 weight percent fluoride.

8. A process for hydrocracking a hydrocarbon feed to produce lower boiling products which comprises contacting said feed in the presence of hydrogen at hydrocracking conditions with a catalyst comprising a coprecipitated composite of a porous inorganic oxide, at least one catalytic promoter selected from the group consisting of antimony, and compounds of antimony, and at least one hydrogenating metal component selected from the iron transitional group metals, and compounds thereof, said hydrogenating metal component being in an amount from about 3 to 15 weight percent metal and the weight ratio of said catalytic promoter to said hydrogenating metal component, expressed as metal, being from about 0.1 to 4.

9. A process for hydrocracking a hydrocarbon feed to produce lower boiling products which comprises contacting said feed in the presence of hydrogen at hydrocracking conditions with a catalyst comprising a hydrogenating metal component selected from the group consisting of nickel, and compounds of nickel, in an amount from about 3 to 15 weight percent nickel, at least one catalytic promoter selected from the group consisting of antimony, and compounds of antimony, the weight ratio of said catalytic promoter to said hydrogenating metal component, expressed as metal, being from about 0.1 to 4, a porous, amorphous inorganic oxide, and a crystalline zeolitic aluminosilicate having uniform pore dimensions of from about 6 to 15 A. in an amount from about 5 to 80 weight percent, said hydrogenating metal component, said catalytic promoter and said porous amorphous inorganic oxide being present as a coprecipitated composite and said crystalline zeolitic aluminosilicate being intimately admixed with and dispersed throughout said coprecipitated composite.

10. In a process for hydrocracking a hydrocarbon feed to lower boiling products under hydrocracking conditions including a temperature of from 450°–900° F. and a pressure from 1200 to 6000 p.s.i.g. and in the presence of at least 1000 s.c.f. hydrogen/bbl. feed with a catalyst comprising nickel, or compounds thereof, in an amount from about 3 to 15 weight percent metal, associated with a support, the improvement for increasing the hydrogenation activity of said catalyst which comprises using as said support a coprecipitated composite of a porous inorganic oxide and at least one catalytic promoter selected from the group consisting of antimony and compounds of antimony, the weight ratio of said catalytic promoter to nickel, expressed as metal, being from about 0.1 to 4.

References Cited

UNITED STATES PATENTS

| | | | |
|---|---|---|---|
| 3,140,253 | 7/1964 | Plank et al. | 208—120 |
| 3,206,391 | 9/1965 | Gutberiet et al. | 208—110 |
| 3,248,316 | 4/1966 | Barger et al. | 208—58 |

ABRAHAM RIMENS, *Primary Examiner.*